(12) United States Patent
White et al.

(10) Patent No.: US 12,743,540 B2
(45) Date of Patent: Sep. 22, 2026

(54) METHODS FOR VERIFYING DATABASE QUERY RESULTS AND DEVICES THEREOF

(71) Applicant: SPACE AND TIME LABS, INC., San Clemente, CA (US)

(72) Inventors: Jay Thomas White, Lexington, KY (US); Scott Edward Daly Dykstra, Fort Myers, FL (US)

(73) Assignee: MAKEINFINITE LABS, INC., San Clemente, CA (US)

( * ) Notice: Subject to any disclaimer, the term of this patent is extended or adjusted under 35 U.S.C. 154(b) by 116 days.

(21) Appl. No.: 18/582,023

(22) Filed: Feb. 20, 2024

(65) Prior Publication Data

US 2024/0193296 A1 Jun. 13, 2024

Related U.S. Application Data

(63) Continuation of application No. 18/527,580, filed on Dec. 4, 2023, now Pat. No. 12,001,582, which is a (Continued)

(51) Int. Cl.

| | |
|---|---|
| ***G06F 21/60*** | (2013.01) |
| ***G06F 16/24*** | (2019.01) |
| ***G06F 21/62*** | (2013.01) |

(52) U.S. Cl.
CPC .. *G06F 21/6227* (2013.01); *G06F 2221/2101* (2013.01); *G06F 2221/2115* (2013.01)

(58) Field of Classification Search
None
See application file for complete search history.

(56) References Cited

U.S. PATENT DOCUMENTS

2012/0209822 A1* 8/2012 Prabhakar ........... G06F 16/2365 707/703
2019/0087600 A1* 3/2019 Sion ...................... H04L 9/0861
(Continued)

FOREIGN PATENT DOCUMENTS

CN 111783108 A * 10/2020 ............. G06Q 40/03
CN 111783109 B * 8/2023 ........... G06F 21/602
(Continued)

OTHER PUBLICATIONS

Second Office Action dated Oct. 12, 2024. China Patent Application No. 202280008892.2.

(Continued)

*Primary Examiner* — Christopher B Robinson
(74) *Attorney, Agent, or Firm* — Troutman Pepper Locke LLP

(57) ABSTRACT

Methods, non-transitory computer readable media, and verifier and/or prover devices or query verification apparatuses are disclosed that generate a first commitment from received data and send the received data to a prover device for insertion into a table of a database. A query result and an overall proof are received from the prover device in response to a received query forwarded to the prover device and associated with the database table. The overall proof is generated from one or more partial proofs comprising one or more commitments generated from one or more intermediate values. The query result and an indication the query result was verified are returned in response to the received query after verifying the query result based on a second commitment to the query result generated using the first commitment and the overall proof.

20 Claims, 10 Drawing Sheets

Related U.S. Application Data continuation of application No. 18/079,381, filed on Dec. 12, 2022, now Pat. No. 11,874,948, which is a continuation of application No. 17/897,102, filed on Aug. 26, 2022, now Pat. No. 11,526,622.

(60) Provisional application No. 63/357,930, filed on Jul. 1, 2022.

(56) References Cited

U.S. PATENT DOCUMENTS

| | | | | |
|---|---|---|---|---|
| 2020/0126075 | A1 * | 4/2020 | Fisch | G06F 21/6245 |
| 2020/0184470 | A1 * | 6/2020 | Singh | H04L 63/123 |
| 2020/0304309 | A1 * | 9/2020 | Naqvi | H04L 9/3239 |
| 2022/0188446 | A1 * | 6/2022 | Vinayagamurthy | G06F 21/6227 |

FOREIGN PATENT DOCUMENTS

| | | | |
|---|---|---|---|
| WO | 2008147400 | A1 | 12/2008 |
| WO | 2024233877 | A2 | 11/2024 |

OTHER PUBLICATIONS

Privacy-Preserving Computation and Verification of Aggregate Queries on Outsourced Databases, Brian Thompson et al., Privacy Enhancing Technologies, pp. 185-201, Aug. 5, 2009.

Extended European Search Report for EP application No. 22902452.6, dated Dec. 12, 2022.

Mykletun, et al., "Authentication and Integrity in Outsourced Databases," ACM Transactions on Storage, 2:2 (pp. 107-138) (May 2006).

Thompson, et al., "Privacy-Preserving Computation and Verification of Aggregate Queries on Outsources Databases," PETS 2009, LNCS 5672, pp. 185-201 (2009).

Zhang, et al., "IntegriDB: Verifiable SQL for Outsources Databases," 2015 ACM. ISBN 978-1-4503-3832 (May 15, 2010).

Zhang, et al., "vSQL: Verifying Arbitrary SQL Queries over Dynamic Outsources Databases," 2017 IEEE Symposium on Security and Privacy.

Zhang, et aL, "IntegriDB: Verifiable SQL for Outsources Databases," 2015 ACM. ISBi'-i 978-1-4503-3832 (May 15, 2010).

Bernstein, Daniel, Curve25519: New Diffie-Hellman Speed Records, 2016.

Pedersen, T. P., "Non-Interactive and Information-Theoretic Secure Verifiable Secret Sharing," Advances in Cryptology—Crypto 1991.

Pippenger, Nicholas, "On the Evaluation of Powers and Monomials," SIAM Journal on Computing 9.2 (1980).

* cited by examiner

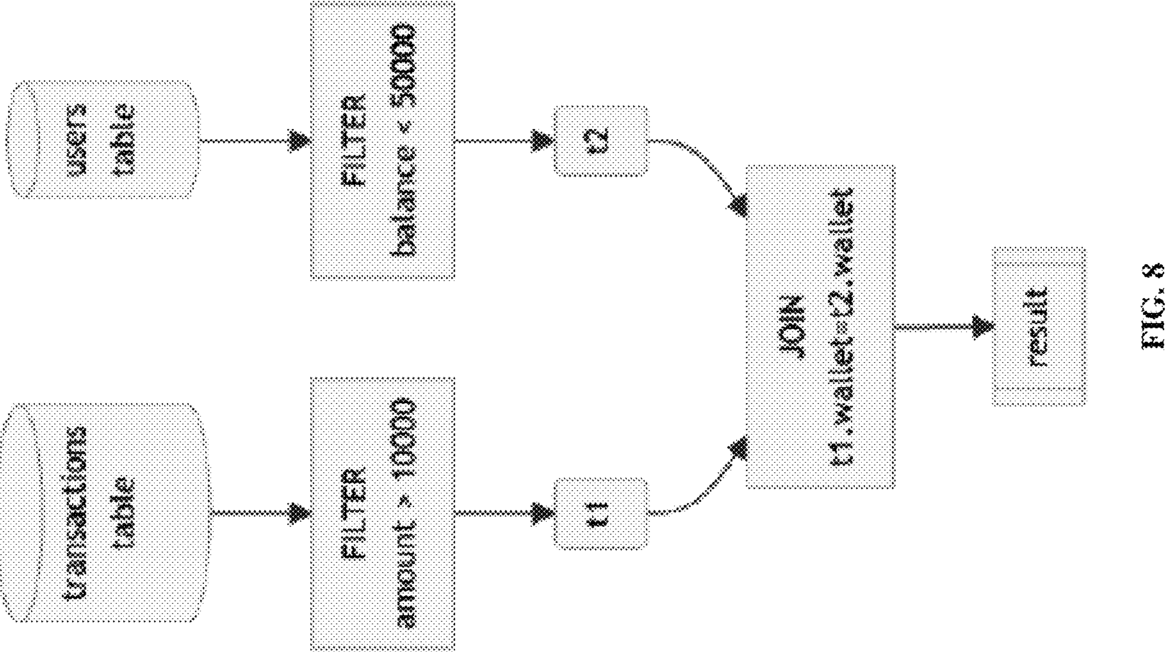
FIG. 8
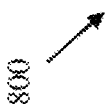

METHODS FOR VERIFYING DATABASE QUERY RESULTS AND DEVICES THEREOF

This application is a continuation of U.S. patent application Ser. No. 18/527,580, filed Dec. 4, 2023, which is a continuation of U.S. patent application Ser. No. 18/079,381, filed Dec. 12, 2022, which is a continuation of U.S. patent application Ser. No. 17/897,102, filed Aug. 26, 2022, which claims priority to U.S. Provisional Patent Application Ser. No. 63/357,930, filed Jul. 1, 2022, each of which is incorporated by reference herein in its entirety.

FIELD

This technology generally relates to outsourced database security and, more particularly, to methods and devices for verifying outsourced database query results to mitigate tampering.

BACKGROUND

Outsourced databases are increasingly utilized for data storage and retrieval. Although databases can have any number of topologies, including centralized databases, one ubiquitous type of deployment of an outsourced database is a decentralized database hosted across a plurality of servers, other computing devices, or other hardware resources (e.g., in a cloud network). As one example, a blockchain network includes decentralized nodes that maintain a database in the form of a distributed ledger that encapsulates data stored on the blockchain network.

However, the owner of the resources hosting outsourced databases may have the ability to tamper with the stored data or the results of queries sent from the hosted databases. In a blockchain network, nodes that comprise the decentralized database are generally untrustworthy and susceptible to tampering and other malicious activity, particularly when bad actors are incentivized by the nature of the stored data (e.g., cryptocurrency data). While both centralized and decentralized databases can be untrustworthy, in a completely decentralized topology, anyone has the ability to act as a database host, which increases the risk of tampering and decreases the trustworthiness query results being returned from the database.

Unfortunately, there is currently no efficient way to prove database query results that are executed against data maintained by an outsourced database hosted on resources provided by untrusted third party network participant(s). More specifically, current attempts to verify database query results add significant computation and associated overhead to the database queries themselves, which limits database scalability.

SUMMARY

A verifier device is disclosed that includes memory comprising programmed instructions stored thereon and a processor coupled to the memory and configured to execute the stored programmed instructions to generate a first commitment from received data and send the received data to a prover device for insertion into a table of a database. A query result and an overall proof are received from the prover device in response to a received query forwarded to the prover device and associated with the database table. The overall proof is generated from one or more partial proofs comprising one or more commitments generated from one or more intermediate values. The query result and an indication the query result was verified are returned in response to the received query after verifying the query result based on a second commitment to the query result generated using the first commitment and the overall proof.

A method for facilitating verification of database query results also is disclosed that is implemented by a provider device and includes receiving data from a verifier device, storing the received data into a table of a database, and receiving a query associated with the database table from the verifier device. A query plan and a query result are generated for the query, one or more partial proofs are generated from one or more commitments, and an overall proof is generated from the one or more partial proofs. Each of the one or more partial proofs is associated with at least one node of the query plan. The overall proof is returned along with the query result in response to the query to facilitate verification of the query result.

Additionally, A query verification apparatus also is disclosed that includes a verifier device comprising first memory comprising first programmed instructions stored thereon and a first processor coupled to the first memory and configured to execute the stored first programmed instructions to generate a first commitment from received data and send the received data to at least one prover device for insertion into a table of a database. A query result and an overall proof are received from the at least one prover device in response to a received query forwarded to the at least one prover device and associated with the database table. The overall proof is generated from one or more partial proofs comprising one or more commitments generated from one or more intermediate values. The query result and an indication the query result was verified are returned in response to the received query after verifying the query result based on a second commitment to the query result generated using the first commitment and the overall proof.

This technology provides a number of advantages including methods, non-transitory computer readable media, and query verification apparatuses that advantageously facilitate trust for query results generated from untrusted centralized and decentralized database hosts. In some examples, this technology leverages one or more of commitments, GPUs, and/or query plans to verify the accuracy of query results. The commitments are updatable and the query results are verified by a device (e.g., a client device or a third party intermediary or gateway) that does not have access to the data stored in the database. Accordingly, this technology more effectively and efficiently verifies queries in databases with significantly improved scalability. This significantly improved scalability facilitates practical applications for technology in this domain, including the processing of data volumes orders of magnitude greater.

BRIEF DESCRIPTION OF THE DRAWINGS

FIG. 8 is a flow diagram of an exemplary query plan used to generate a query result for an example query;

DETAILED DESCRIPTION

Figure 1:
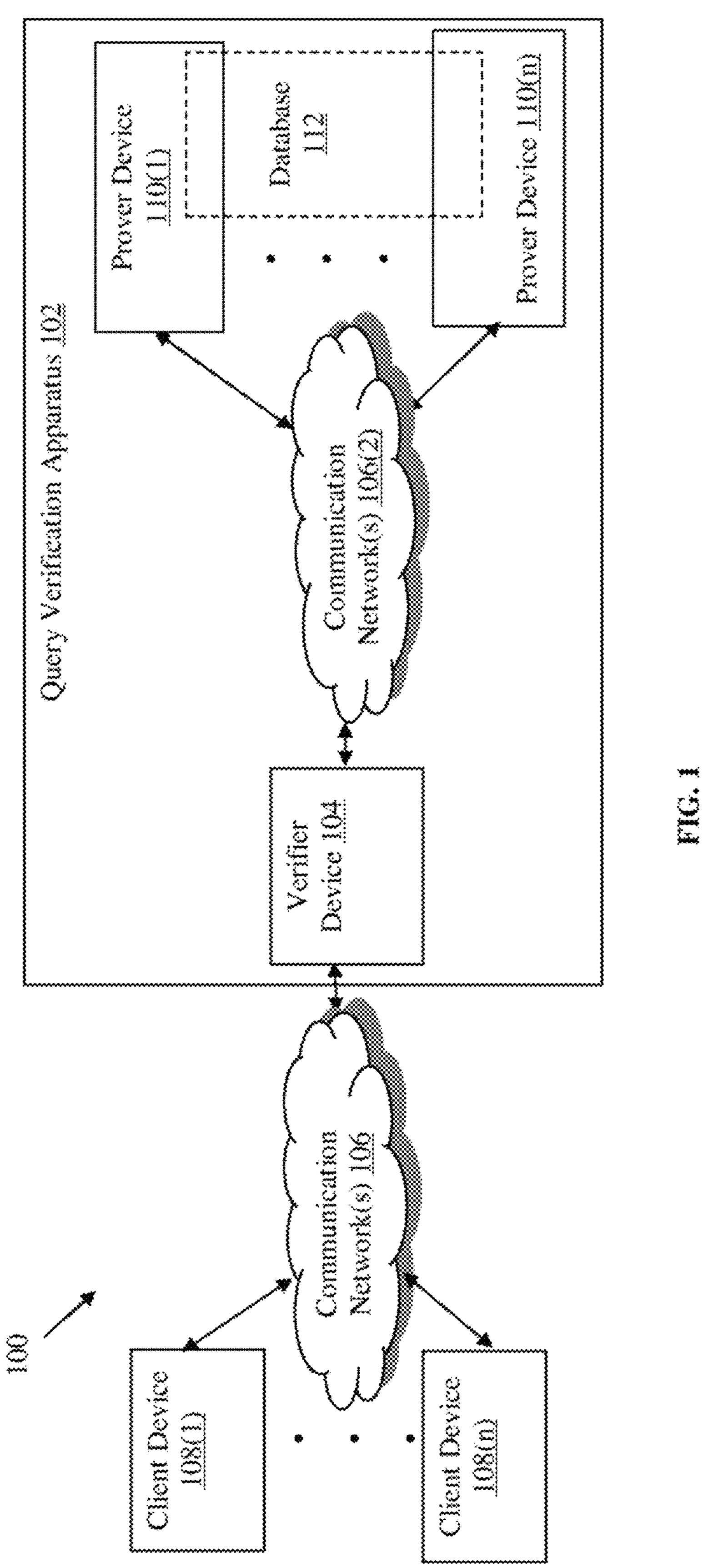
FIG. 1 is a block diagram of an exemplary network environment with a query verification apparatus that includes a verifier device and prover devices.

Referring to FIG. 1, an exemplary network environment 100 is illustrated that includes a query verification apparatus 102 with a verifier device 104 coupled, via communication network(s) 106(1), to client devices 108(1)-108(*n*) and, via communication network(s) 106(2), to prover devices 110(1)-110(*n*) hosting a database 112. The network environment 100 may include other network devices such as one or more routers or switches, for example, which are known in the art and thus will not be described herein. This technology provides a number of advantages including methods, non-transitory computer readable media, and devices that ingest data and return query results with improved security to effectively transform untrusted outsourced databases into trusted databases.

In this particular example, the client devices 108(1)-108(*n*), verifier device 104, and prover devices 110(1)-110(*n*) are disclosed in FIG. 1 as dedicated hardware devices. However, one or more of the client devices 108(1)-108(*n*), verifier device 104, or prover devices 110(1)-110(*n*) can also be implemented in software within one or more other devices in the network environment 100. As one example, the verifier device 104, as well as any of its components or applications, can be implemented as software executing on one of the client devices 108(1)-108(*n*), and many other permutations and types of implementations and network topologies can also be used in other examples.

Figure 2:
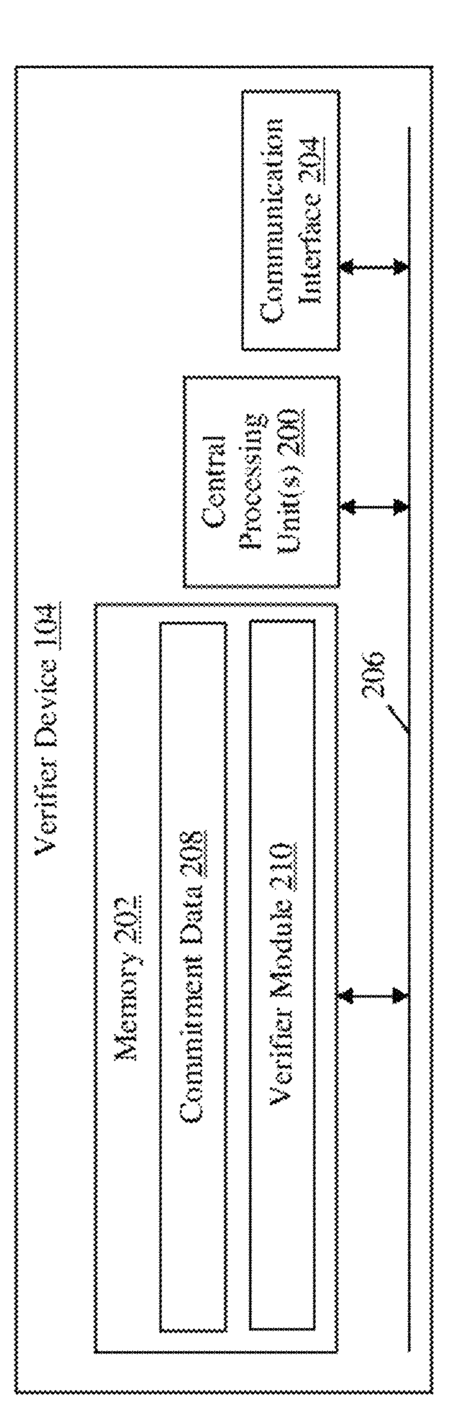
FIG. 2 is a block diagram of an exemplary verifier device.

Referring to FIGS. 1-2, the verifier device 104 of the query verification apparatus 102 may perform any number of functions, including providing interfaces to the client devices 108(1)-108(*n*) for ingesting data to be stored on the database 112 hosted by the prover devices 110(1)-110(*n*) and processing query results from the prover devices 110(1)-110(*n*). The verifier device 104 in this example includes central processing unit(s) (CPU(s)) 200, memory 202, and a communication interface 204, which are coupled together by a bus 206, although the verifier device 104 can include other types or numbers of elements in other configurations.

The CPU(s) 200 of the verifier device 104 may execute programmed instructions stored in the memory 202 of the verifier device 104 for any number of the functions described and illustrated herein. The CPU(s) 200 may include one or more general purpose processors with one or more processing cores, for example, although other types of processor(s) can also be used. In other examples, the verifier device 104 can include one or more graphics processing units (GPUs) configured to perform functions described in more detail below with reference to the corresponding hardware of the prover device 110 and FIG. 3.

The memory 202 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 202.

Accordingly, the memory 202 can store applications that can include computer executable instructions that, when executed by the CPU(s) 200, cause the verifier device 104 to perform actions, such as to transmit, receive, or otherwise process network messages and requests, for example, and to perform other actions described and illustrated below. The application(s) can be implemented as components of other applications, operating system extensions, and/or plugins, for example.

Further, the application(s) may be operative in a cloud-based computing environment with access provided via a software-as-a-service (SaaS) model. The application(s) can be executed within or as virtual machine(s) or virtual server(s) that may be managed in a cloud-based computing environment. Also, the application(s), and even the verifier device 104 itself, may be located in virtual server(s) running in a cloud-based computing environment rather than being tied to specific physical network computing devices. Also, the application(s) may be running in virtual machines (VMs) executing on the verifier device and managed or supervised by a hypervisor.

In this particular example, the memory 202 includes commitment data 208 and a verifier module 210. The verifier module 210 is configured to generate commitments upon ingesting data, as described and illustrated in more detail below. The commitments are per-column values stored in the commitment data 208 that are used by the verifier module 210 to verify query results returned from the prover devices 110(1)-110(*n*), also as described and illustrated in more detail below. Other information can be stored in the memory 202 in other examples, and other data stores and/or applications or modules also can be hosted by the verifier device 104 in other examples.

The communication interface 204 of the verifier device 104 operatively couples and communicates between the verifier device 104, client devices 108(1)-108(*n*), and prover devices 110(1)-110(*n*), which are coupled together at least in part by the communication network(s) 106(1) and 106(2) in this particular example, although other types or numbers of communication networks or systems with other types or numbers of connections or configurations to other devices or elements can also be used. The communication network(s) 106(1) and 106(2) can be wide area network(s) (WAN(s)) and/or local area network(s) (LAN(s)), for example, and can use TCP/IP over Ethernet and industry-standard protocols, although other types or numbers of protocols or communication networks can be used. The communication network(s) 106 can employ any suitable interface mechanisms and network communication technologies including, for example, Ethernet-based Packet Data Networks (PDNs).

While the verifier device 104 is illustrated in this example as including a single device, the verifier device 104 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the verifier device 104. Additionally, one or more of the devices that together comprise the verifier device 104 in other examples can be standalone devices or integrated with one or more other devices or apparatuses.

Figure 3:
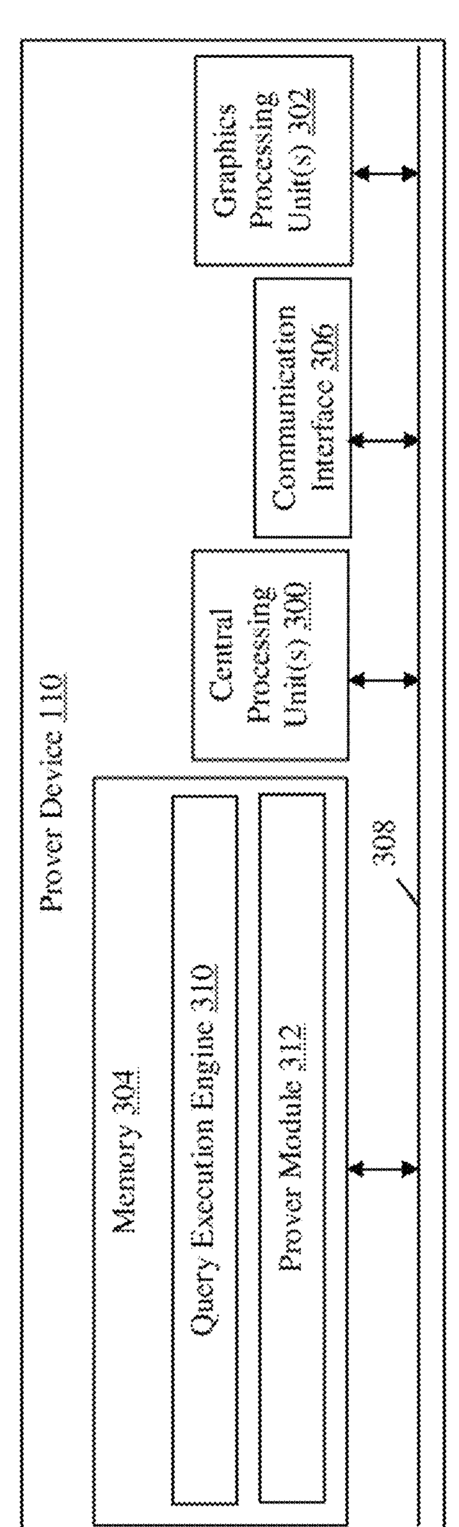
FIG. 3 is a block diagram of an exemplary prover device.

Referring more specifically to FIGS. 1 and 3, the prover device 110 of the query verification apparatus 102 may perform any number of functions, including hosting the database 112, processing queries to generate query results from the contents of the database 112, and generating proofs to facilitate query result verification by the verifier device 104, for example. The prover device 110 in this example includes CPU(s) 300, GPU(s) 302, memory 304, and a communication interface 306, which are coupled together by a bus 308, although the prover device 110 can include other types or numbers of elements in other configurations.

The CPU(s) 200 and GPU(s) 302 of the prover device 110 may execute programmed instructions stored in the memory 304 for any number of the functions described and illustrated herein. The CPU(s) 200 may include one or more general purpose processors with one or more processing cores, for example, although other types of processor(s) can also be used. The GPU(s) 302 can be configured to process relatively large blocks of data in parallel in order to accelerate certain processing functions. In some examples described and illustrated in more detail below, the GPU(s) 302 are used to generate commitments and the CPU(s) 200 facilitate the remaining functionality of the prover device 110, although other implementations can also be used.

The memory 304 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the CPU(s) 300 and/or GPU(s) 302, can be used for the memory 304.

Accordingly, the memory 304 can store applications that can include computer executable instructions that, when executed by the CPU(s) 300 and/or GPU(s) 302, cause the prover device 110 to perform actions, such as to transmit, receive, or otherwise process network messages and requests, for example, and to perform other actions described and illustrated below. The application(s) can be implemented as components of other applications, operating system extensions, and/or plugins, for example.

Further, the application(s) may be operative in a cloud-based computing environment with access provided via a software-as-a-service (SaaS) model. The application(s) can be executed within or as virtual machine(s) or virtual server(s) that may be managed in a cloud-based computing environment. Also, the application(s), and even the prover device 110 itself, may be located in virtual server(s) running in a cloud-based computing environment rather than being tied to specific physical network computing devices. Also, the application(s) may be running in VMs executing on the verifier device and managed or supervised by a hypervisor.

In this particular example, the memory 304 includes a query execution engine 310 and a prover module 312. The query execution engine 310 is configured to execute queries received from the client devices 108(1)-**108(*n*) against the database 112 and generate a query result. In some examples, the database 112 can be a structured query language (SQL) database and the query execution engine 310** can therefore be a SQL engine, although the technology described and illustrated herein is operable with NoSQL and other types of databases as explained in more detail below.

The prover module 312 is configured to generate proofs that can be provided to the verifier device 104 along with query results to facilitate verification of the query results by the verifier device 104, as described and illustrated in more detail below. Other information can be stored in the memory 304 in other examples, and other data stores and/or applications or modules also can be hosted by the prover device 110 in other examples.

The communication interface 306 of the prover device 110 operatively couples and communicates between the verifier device 104 and other of the prover devices 110(1)-**110(*n*), which are coupled together at least in part by communication network(s) (e.g., a WAN or LAN(s)) (not shown) or a direct connection, for example. In some examples, the prover devices 110(1)-110(*n*) are database servers deployed in a decentralized network and communicated across communication network(s) and the database 112** is a decentralized database, although other types of implementations can also be used. Additionally, other types or numbers of networks and connections with other types or numbers of configurations to other devices or elements can also be used in other examples.

While the prover device 110 is illustrated in this example as including a single device, the prover device 110 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the prover device 110. Additionally, one or more of the devices that together comprise the prover device 110 in other examples can be standalone devices or integrated with one or more other devices or apparatuses.

Each of the client devices 108(1)-**108(*n*) of the network environment 100 in this example includes any type of computing device that can exchange network data, such as mobile, desktop, laptop, or tablet computing devices, virtual machines (including cloud-based computers), or the like. Each of the client devices 108(1)-108(*n*)** in this example includes a processor, memory, and a communication interface, which are coupled together by a bus or other communication link (not illustrated), although other numbers or types of components could also be used.

Each of the client devices 108(1)-**108(*n*) may run services and/or interface applications, such as standard web browsers or the standalone applications, which may provide an interface to communicate with the verifier device 104 via the communication network(s) 106. Each of the client devices 108(1)-108(*n*)** may further include a display device, such as a display screen or touchscreen, or an input device, such as a keyboard or mouse, for example (not shown).

Although the exemplary network environment 100 with the client devices 108(1)-**108(*n*), verifier device 104, prover devices 110(1)-110(*n*), and communication network(s) 106(1) and 106(2)** are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the client devices 108(1)-108(*n*), verifier device 104, or prover devices 110(1)-110(*n*), for example, may be configured to operate as virtual instances on the same physical machine. In other words, one or more of the client devices 108(1)-108(*n*), verifier device 104, or prover devices 110(1)-110(*n*) may operate on the same physical device rather than as separate devices communicating through the communication network(s) 106(1) and/or 106(2) Additionally, there may be more or fewer client devices, verifier devices, or prover devices than illustrated in FIG. 1.

The examples of this technology may also be embodied as one or more non-transitory computer readable media having instructions stored thereon, such as in the memory 202 and/or 304, for one or more aspects of the present technology, as described and illustrated by way of the examples herein. The instructions in some examples include executable code that, when executed by one or more processors, such as the CPU(s) 200 and/or 300 and/or GPU(s) 302, cause the processors to carry out steps necessary to implement the methods of the examples of this technology that will now be described and illustrated herein.

Figure 4:
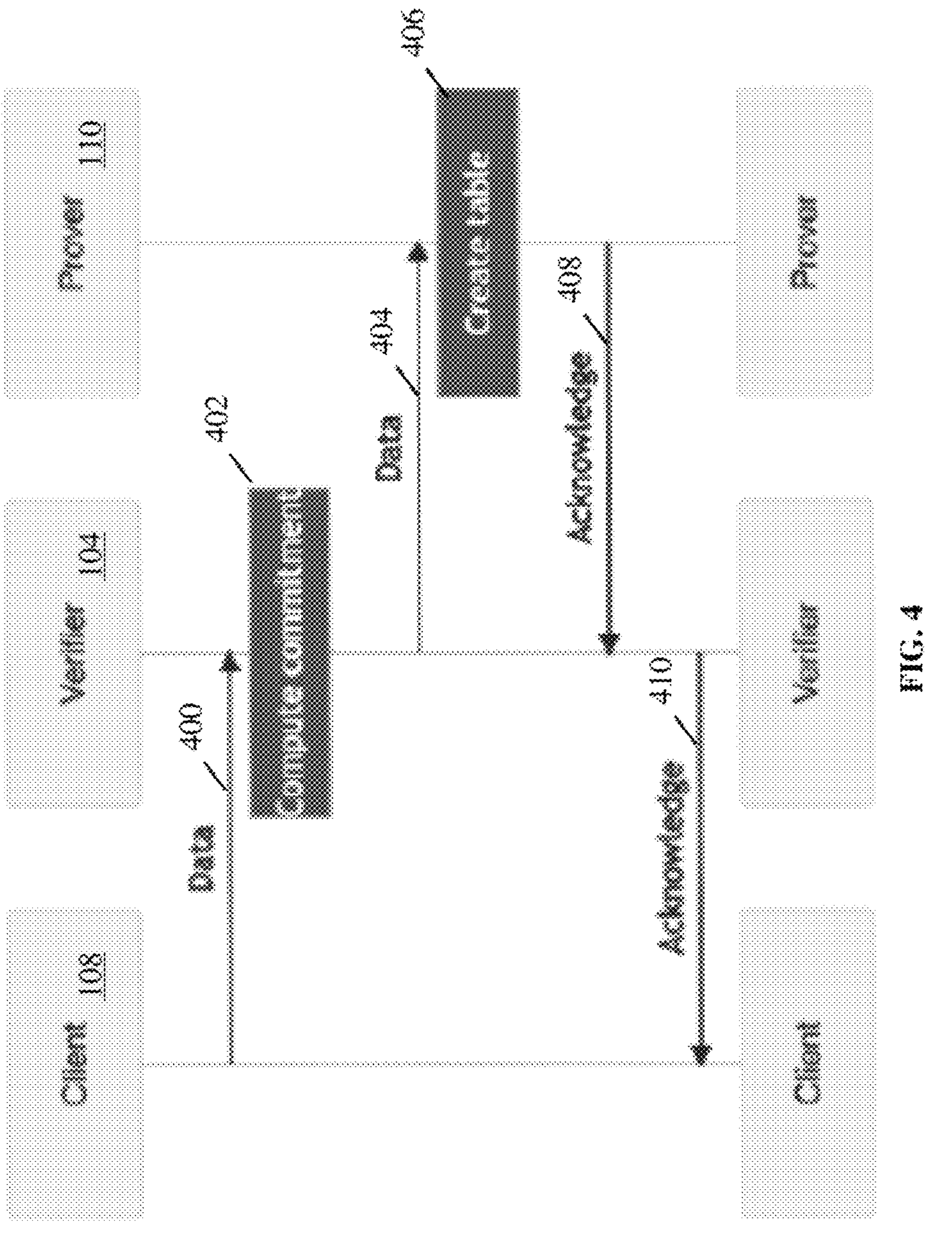
FIG. 4 is a timing diagram of an exemplary method for ingesting data to facilitate database query result verification.

Referring now to FIG. 4, a timing diagram of an exemplary method for ingesting data to facilitate database query result verification is illustrated. In step 400 in this example, a client device 108 sends a request via the communication network(s) 106 to store data included with the request in the database 112 hosted at least in part by the prover device 110. Accordingly, in this particular example, the verifier device 104 is effectively a gateway disposed between the client device 108 and the prover device 110.

In step 402, the verifier device of the query verification apparatus 102 receives or intercepts the request from the client device 108 and generates and stores locally (e.g., in the memory 304) a commitment to the data (e.g., the table in the database 112 that will store the data) associated with the request and to be stored in the database 112. The commitment in this example is a relatively small "digest" of the data, which holds sufficient information to subsequently ensure that the data is not tampered with, as described and illustrated in more detail below along with an exemplary commitment scheme.

In step 404, the verifier device 104 sends the data to the prover device 110 of the query verification apparatus 102 for storage in the database 112. In step 406, the prover device 110 creates a table in the database 112 (e.g., a SQL database, although any other type of database can also be used) and inserts the data into the table (or other database storage structure). In step 408, the prover device 110 optionally sends an acknowledgement to the verifier device 104, which, in step 410, optionally sends another acknowledgement to the client device 108 indicating that storage of the requested data in the database 112 was successful.

Figure 5:
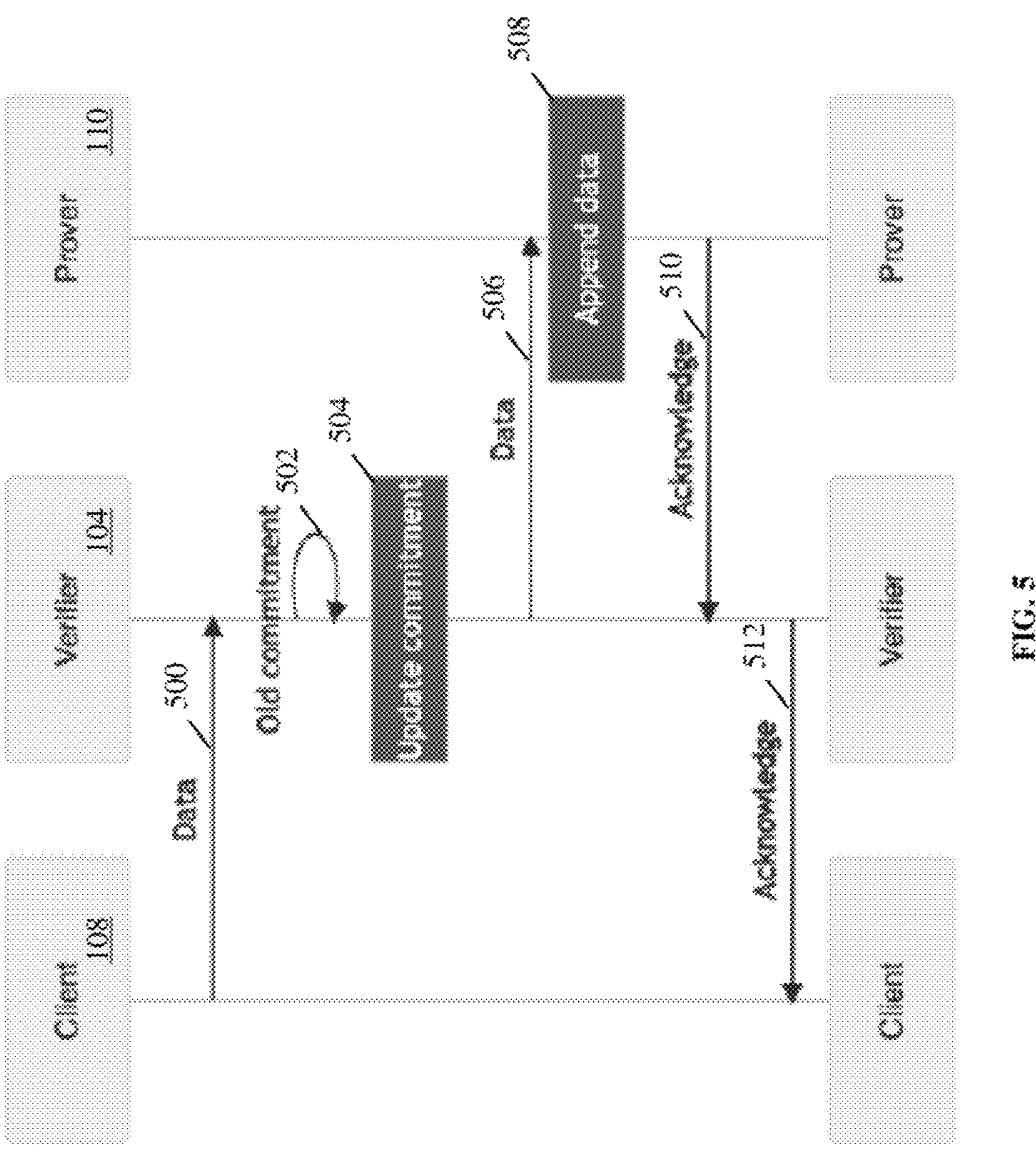
FIG. 5 is a timing diagram of an exemplary method for updating a commitment following ingest of new data.

In the examples described and illustrated herein, the commitment is advantageously updatable by the verifier device 104 without requiring the verifier device 104 to access to the old, existing data. Referring to FIG. 5, a timing diagram of an exemplary method for updating a commitment following ingest of new data is illustrated. In step 500 in this example, the client device 108 sends new data as part of a storage request directed to the database 112. The new data is to be appended to the same table as created in step 406 of FIG. 4 in this example.

In step 502, the verifier device 104 receives the request from the client device 108, retrieves the stored commitment to the associated data and, in step 504, updates the retrieved commitment. In order for the verifier device 104 to be able to combine the old, retrieved commitment with the incoming new data to create a new commitment to the entire updated table, without access to the old, existing data stored in the table, a Pedersen commitment and associated scheme can be used in some examples, although other types of algorithms can be used to generate other types of commitments, including KZG commitments, and FRI commitments, for example.

A Pedersen commitment scheme lends itself to faster development, and shorter time to market, and has advantageous mathematical properties. In one particular example, $a_0, a_1, a_2, \ldots$ is a column of data (e.g., in a database table) and the Pedersen commitment is $a_0 \cdot G_0 + a_1 \cdot G_1 + a_2 \cdot G_2 + \ldots$, where the $G_i$'s are "random," public, and transparent parameters that do not require a trusted setup phase, as is required by some other commitment schemes.

Pedersen commitments are also relatively easily updatable such that all that needs to be done to append to a commitment is to add an extra term to the above sum for each new piece of data. Further, Pedersen commitment computation speed can be improved using Curve25519 as an elliptic curve and the GPU(s) 302 for parallel processing. Curve25519 is described in Bernstein, Daniel, Curve25519: New Diffie-Hellman Speed Records, 2016, 3958, 207-228. 10.1007/11745853_14, which is incorporated by reference herein in its entirety. Pedersen commitments are further described in Pedersen, T. P., "Non-Interactive and Information-Theoretic Secure Verifiable Secret Sharing," Advances in Cryptology—CRYPTO '91 (pp. 129-140), Springer Berlin Heidelberg, which is incorporated by reference herein in its entirety.

Accordingly, following the update of the commitment in step 504, the verifier device 104 sends the new data to the prover device 110 in step 506. In step 508, the prover device 110 appends the new data to the previously-created and existing table in the database 112. In step 510, the prover device 110 optionally sends an acknowledgement to the verifier device 104, which, in step 512, optionally sends another acknowledgement to the client device 108 indicating that storage of the requested new data in the database 112 was successful.

Figure 6:
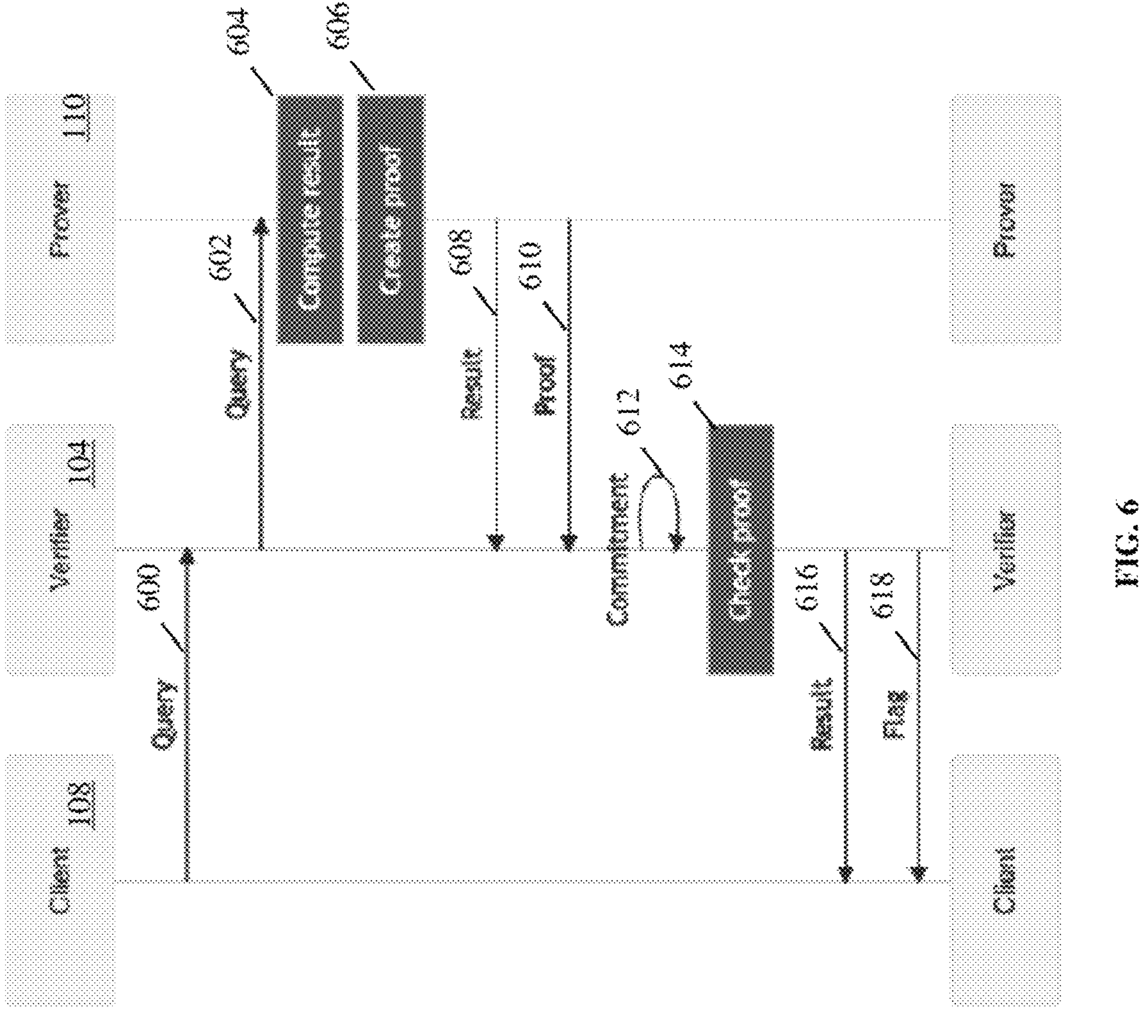
FIG. 6 is a timing diagram of an exemplary method for using a stored commitment to verify a database query result.

Referring to FIG. 6, a timing diagram of an exemplary method for using a stored commitment to verify a database query result is illustrated. In step 600 in this example, the client device 108 sends a query toward the database 112 to extract stored data from at least one table, for example. In step 602, the verifier device 104 receives the query from the client device 108 and forwards the query to the prover device 110 hosting at least a portion of the database 112.

In step 604, the prover device 110 parses executes the query received from the verifier device 104 against the database 112 using the query execution engine 310 to generate a result. In step 606, the prover device 110 generates a proof. The proof can be generated using a method similar to the Pederson commitment scheme described in Bunz, Benedikt, "Bulletproofs: Short Proofs for Confidential Transactions and More," 2018 IEEE Symposium on Security and Privacy (SP), 20-24 May 2018, which is incorporated by reference herein in its entirety, although other schemes and methods for generating the proof can also be used.

Additionally, the proof can be non-interactive using the Fiat-Shamir heuristic, for example. In one example, the proof is generated in step 606 as described and illustrated in more detail below with reference to steps 704-712 of FIG. 7, although the proof can be generated in other ways in other examples. In steps 608 and 610, the prover device 110 then sends the generated result and proof, respectively, to the verifier device 104.

In step 612, the verifier device 104 retrieves the stored commitment for the at least one table to which the query received in step 600 was directed. In step 614, the verifier device 104 uses the retrieved commitment to check the proof received from the prover device 110 in step 610 against the result received from the prover device in step 608, and thereby verify whether the prover device 110 has produced the correct result to the query.

If the verifier device 104 determines that the prover device 110 has produced the correct result to the query, then the verifier device 104 sends the result to the client device 108 from which the query originated in step 616. Optionally, the verifier device 104 sends, in step 618, a tamperproof success flag along with or following the result sent in step 616. The tamperproof success flag can be an indicia that indicates that the result has been verified and the query was therefore not tampered with.

However, if the verifier device 104 determines in step 614 that the proof does not pass, the verifier device 104 does not route the result to the client device 108, and instead sends a failure message. In other examples, the verifier device 104 can send the result to the client device with a tamperproof unsuccessful flag, and other types of communications indicating success and/or failure of the verification on the part of the verifier device 104 can also be used in yet other examples.

Figure 7:
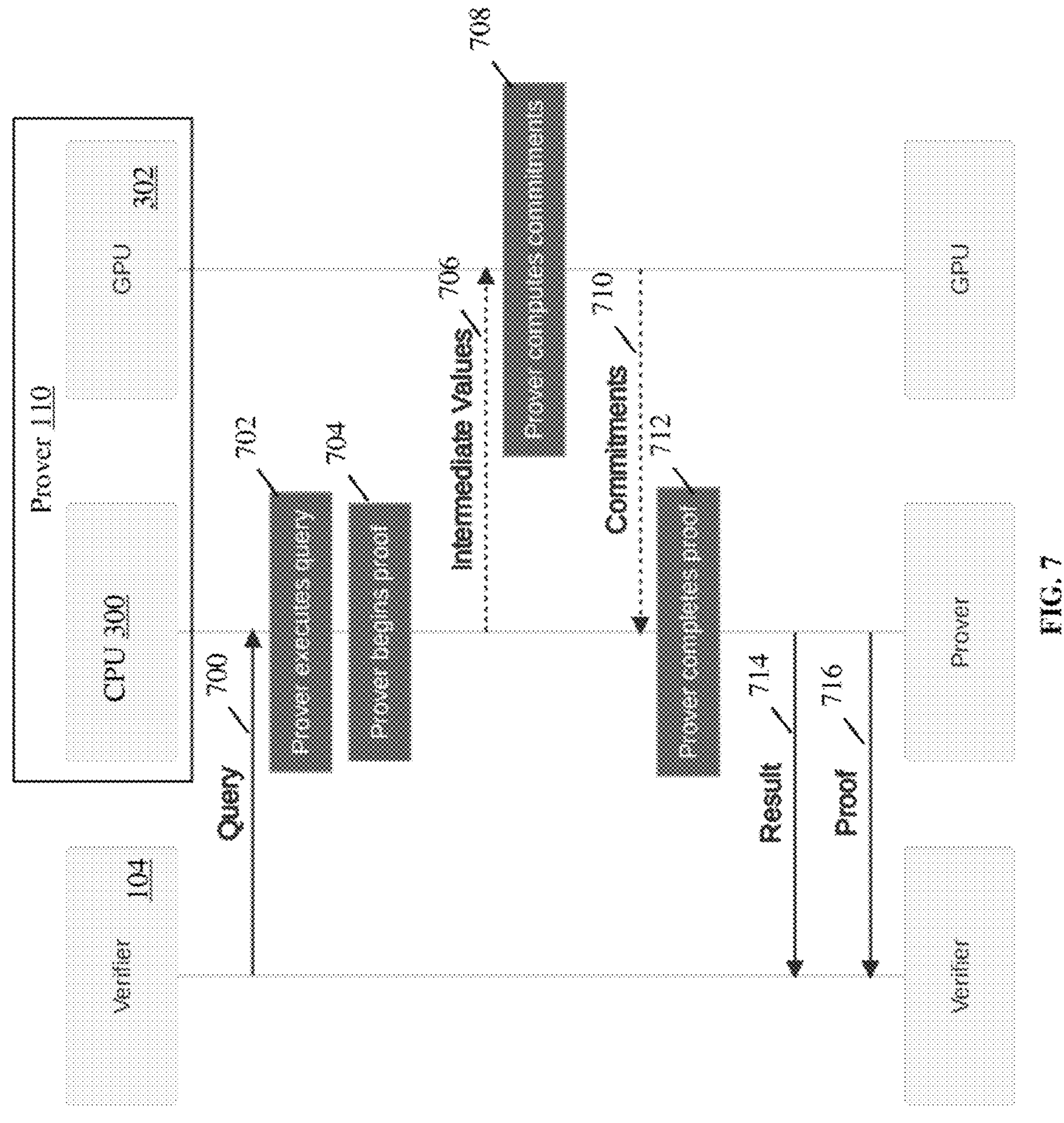
FIG. 7 is timing diagram of an exemplary method for using a graphics processing unity (GPU) to facilitate verification of a database query result.

Referring to FIG. 7, a timing diagram of an exemplary method for using at least one of the GPU(s) 302 to facilitate verification of a database query result is illustrated. A significant portion of the computational cost of this technology revolves around computing commitments. However, the structure of Pedersen commitments, among others, are relatively repetitive and computation can be parallelized. Advantageously, this technology leverages the GPU 302 to provide hardware acceleration for commitment computation and thereby improve scalability of the databases 112. While the GPU 302 is leverage for commitment calculation in this example, one or more other aspects of one or more of the methods described and illustrated herein can also be accelerated using the GPU 302.

In this particular example, steps 700 and 702 are performed by at least one of the CPU(s) 300 as described and illustrated above with reference to steps 602 and 604 of FIG. 6, respectively. However, in step 704, the CPU 300 of the prover device 110 begins to generate the proof by sending intermediate values to the GPU 302 in step 706. The GPU 302 computes commitments based on the intermediate values in step 708.

As the prover device 110 generates the proof of the result, it computes many intermediate columns or values. In certain cases, the commitments to these intermediate values do not need to be computed from scratch, but in many cases, the prover device 110 must provide the verifier device 104 with the commitments to the intermediate values. As a result, the prover device 110 in step 708 may need to compute many commitments at once, and on large datasets.

The Pedersen commitment can be treated as a multi-exponentiation, which is highly parallel. Additionally, because several commitments must be computed together, these multi-exponentiations can be done in parallel as well. In some examples, the GPU 302 computes many exponentials in a single step, and then aggregates them together into the desired commitments. In other examples, optimization can be employed.

For example, Pippenger's algorithm, which is described in Pippenger, Nicholas, "On the Evaluation of Powers and Monomials," SIAM Journal on Computing 9.2 (1980), pp. 230-250, which is incorporated by reference herein in its entirety, can be employed to facilitate optimal asymptotic runtime. In other examples, sparse datasets can be processed more efficiently than with a naive algorithm and, when the data contains small values, the exponentiation computation can be truncated, for additional speed. Other optimizations can also be used in yet other examples.

Referring back to FIG. 7, in step 710, the GPU 302 of the prover device 110 returns a set of commitments to the CPU 300. In step 712, the CPU 300 then completers the generation of the proof, and performs steps 714 and 716 as described and illustrated above with reference to steps 608 and 610 of FIG. 6, respectively.

An exemplary method of generating a proof will now be described and illustrated with reference to FIGS. 8-10. In this particular example, the database 112 is a SQL database, the query execution engine 310 is a SQL engine, and the query is a SQL query, although other types of databases, execution engines, and/or queries can be used in other examples, including NoSQL databases, execution engines, and queries. The query execution engine 310 may begin execution of a query (e.g., in step 604 of FIG. 6 and/or step 702 of FIG. 7) by parsing the query and creating a query plan, which can be a directed acyclic graph (DAG). For purposes of the examples described and illustrated in detail below, an exemplary SQL query (referred to herein as the "example query") is provided as follows:

```
SELECT * FROM (
        SELECT * FROM transactions WHERE amount > 10000
) AS t1 JOIN (
        SELECT * FROM users WHERE balance < 50000
) AS t2 ON transactions_filtered.wallet=users_filtered.wallet
```

Also for purposes of the examples described and illustrated herein, the below transactions and users tables are provided as Table 1 and Table 2, respectively:

TABLE 1

Transactions Table

| wallet | amount | type |
|---|---|---|
| 84448c61caf24b0a9f30bb1c27635aaa | 123 | 0 |
| 81aca786d50c4cc59b919ae9662802a8 | 10000 | 1 |
| 599ffee9812c4d00aff6be58d4192f11 | 203 | 1 |
| 81aca786d50c4cc59b919ae9662802a8 | 40020 | 1 |
| 84448c61caf24b0a9f30bb1c27635aaa | 20000 | 1 |
| 599ffee9812c4d00aff6be58d4192f11 | 4233 | 0 |

TABLE 2

Users Table

| gamer_tag | balance | wallet |
|---|---|---|
| PapaData | 12000 | 81aca786d50c4cc59b919ae9662802a8 |
| SpaceRacer | 3903 | 599ffee9812c4d00aff6be58d4192f11 |
| CosmicCharlie223 | 100300 | 84448c61caf24b0a9f30bb1c27635aaa |
| Worm42 | 3923 | 8358cb96a0d84cf8a0f71b58600dfb76 |

Referring more specifically to FIG. 8, a flow diagram of an exemplary query plan 800 used to generate a query result for an example query is illustrated.

The example query can be broken down by the query execution engine 310 into the DAG consisting of two FILTER nodes and one JOIN node, as illustrated in FIG. 8. To compute the result of the example query, the query execution engine 310 passes each of the two tables into a FILTER node, and then passes the intermediate results coming from those nodes into a JOIN node. The output of the JOIN node is the result of the query.

Figure 9:
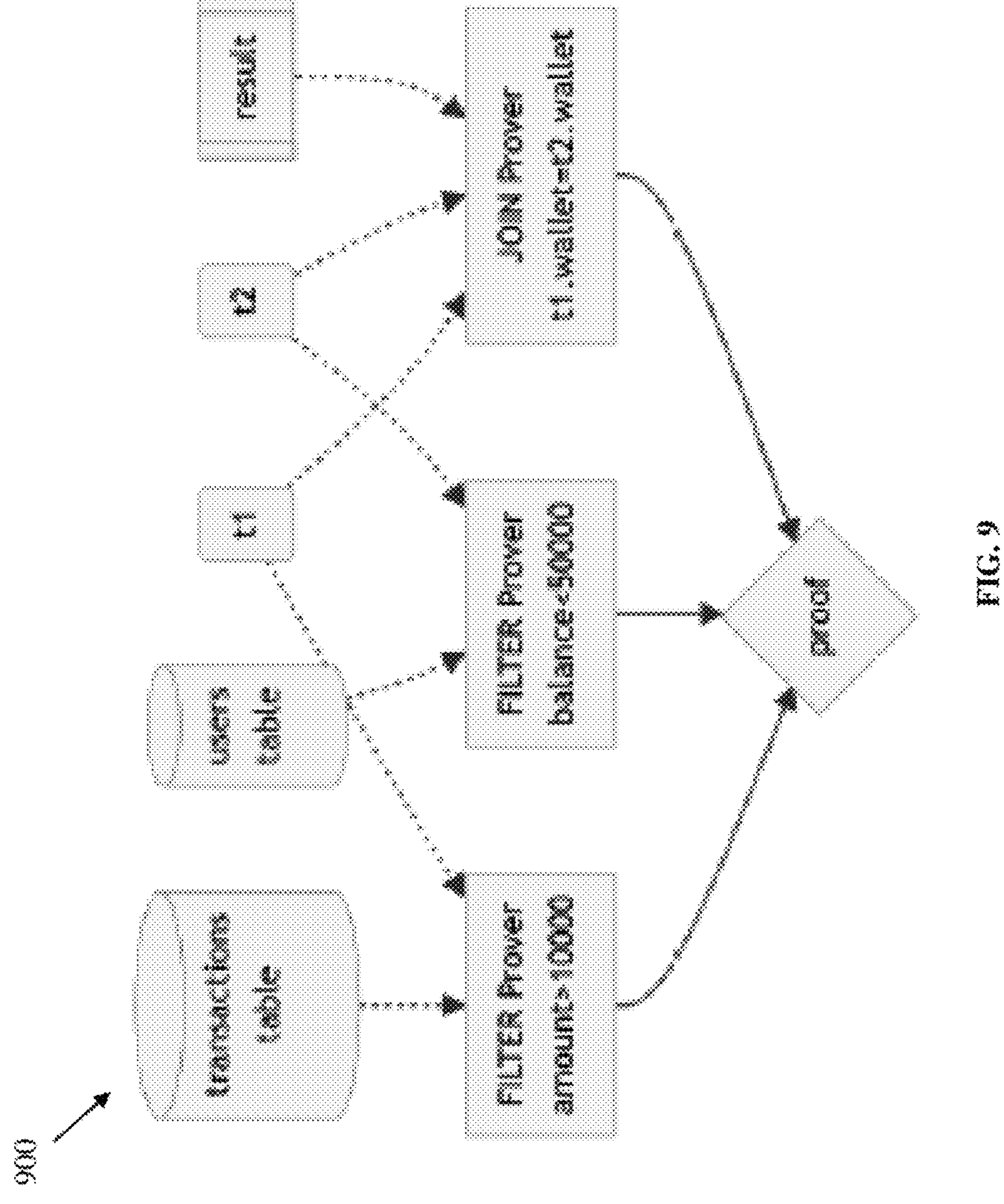
FIG. 9 is a flow diagram of an exemplary proof plan used to generate a proof for the example query.

Referring more specifically to FIG. 9, a flow diagram of an exemplary proof plan 900 used to generate a proof for the example query is illustrated. Proving the example query mirrors the DAG used by the query execution engine 310 in this example. Accordingly, each FILTER or JOIN operation must have a corresponding proof, so a prover node is created for each query execution node in the query plan 800. Since the query execution already computed the intermediate steps, the prover nodes can use those intermediate results. Each of the prover nodes produces a partial proof, and the partial proofs are then aggregated into an overall proof (e.g., in step 606 of FIG. 6).

Figure 10:
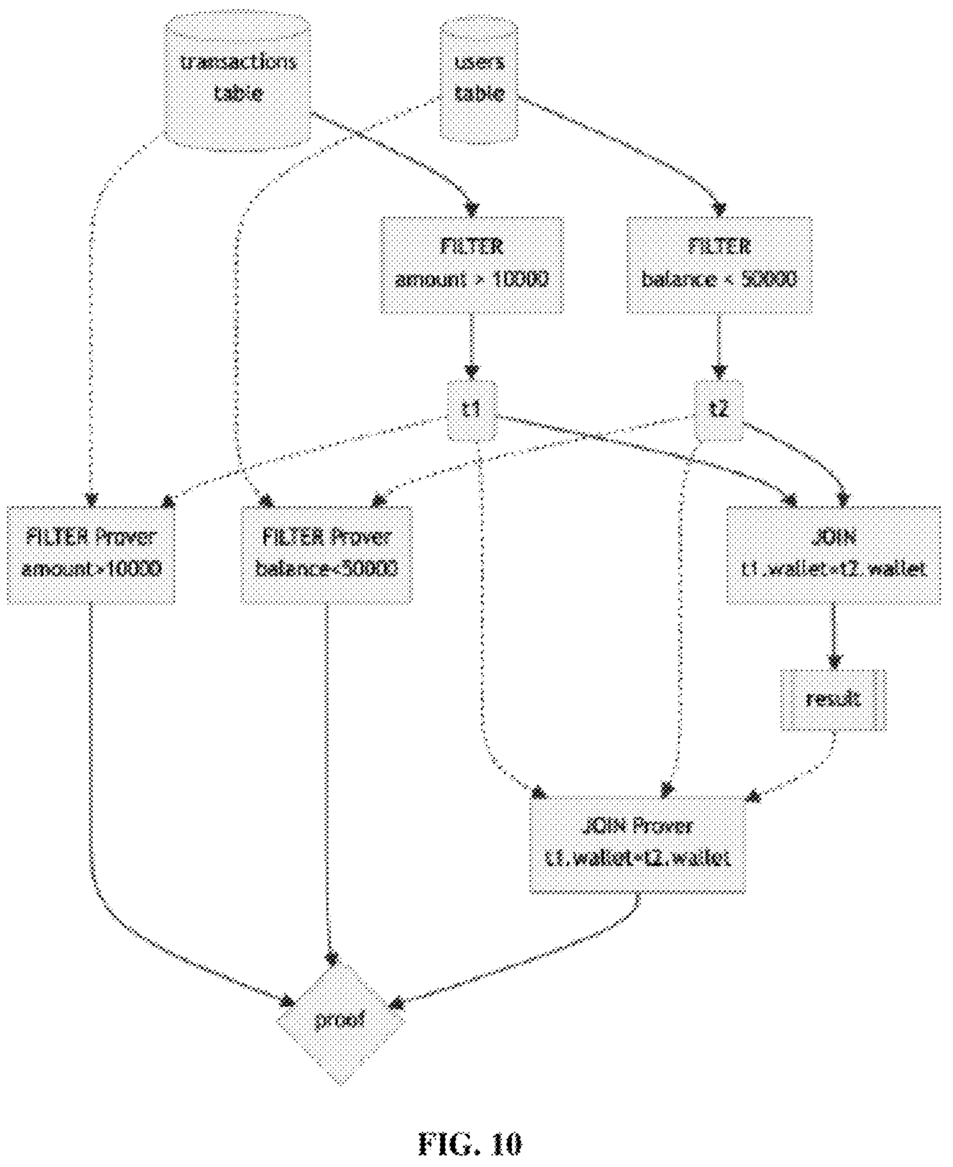
FIG. 10 is a flow diagram of the query plan of FIG. 8 alongside the proof plan of FIG. 9 is illustrated.

Referring more specifically to FIG. 10, a flow diagram of the query plan 800 alongside the proof plan 900 is illustrated. The method illustrated in FIG. 10 can be carried out by the prover device 110 in some examples. Advantageously, in this example, the generation of the proof is relatively efficient based on an integration with the query execution engine 310, with intermediate nodes, corresponding to nodes of a DAG generated by the query execution engine 310 based on the example query, used to generate partial proofs, which are aggregated to form the proof that is returned to the verifier device 104.

Figure 11:
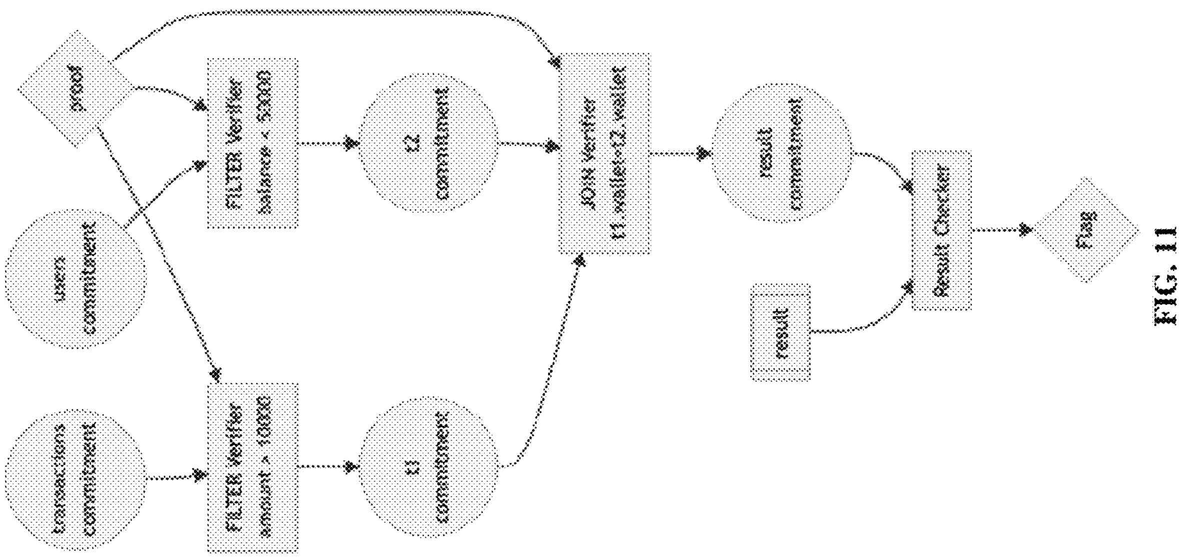
FIG. 11 is a flow diagram of an exemplary method of verifying the query result for the example query using the proof generated via the proof plan of FIG. 9 and the result generated via the query plan of FIG. 8.

Referring to FIG. 11, a flow diagram of an exemplary method of verifying the query result for the example query using the proof generated via the proof plan 900 and the result generated via the query plan 800 is illustrated. The method illustrated in FIG. 11 can be carried out by the verifier device 104 in some examples. In this particular example, the verifier device 104 also mirrors the DAG generated by the query execution engine 310 based on the example query. However, since the verifier device 104 does not have access to the data stored in the database 112, it can only work on commitments.

More specifically, the verifier device 104 begins by retrieving the stored commitments previously generated for the transactions and users tables in this example in which the verifier device 104 attempts to verify the example query. As the prover device 110 transforms data in response to a single step of the example query, the verifier device 104 must apply the corresponding transformation to the commitment of the associated data. With this approach, the computations on commitments by the verifier device 104 are relatively efficient as compared to sending data from the prover device 110 to the verifier device 104, and the verifier device 104 subsequently carrying out the computations.

Once the verifier device 104 has completed its computations on the commitments, it ends up with a commitment to the result, and can then determine whether the result matches or agrees with that commitment to the result. If it does, then the verifier device 104 knows that it is the correct result and, if it does not, the verifier device 104 knows to reject the result. In some examples, portion(s) of the proof are optionally provided by the prover device 110 to the verifier device 104 in order to reduce the computational resourced required of the verifier device 104, which may have constrained computation power.

An exemplary method of verifying a database query according to the technology described and illustrated herein will now be described. In this example, a user of the client device 108 creates a table, appends to it, and then queries the table. Accordingly, the client device 108 sends data to the verifier device 104 with a request to create the employees table illustrated below in Table 3:

TABLE 3

Example Employees table

| Weekly Pay | Yearly Bonus |
|---|---|
| 4000 | 50000 |
| 7500 | 0 |
| 5000 | 400000 |
| 1500 | 0 |

The verifier device 104 accepts this data and computes the commitment to each column. In this case, these commitment are:

$$C_{Pay} = 2000 \cdot G_0 \oplus 7500 \cdot G_1 \oplus 5000 \cdot G_2 \oplus 1500 \cdot G_3$$

$$C_{Bonus} = 50000 \cdot G_0 \oplus 0 \cdot G_1 \oplus 400000 \cdot G_2 \oplus 0 \cdot G_3$$

The verifier then stores these commitments locally and sends the data to the prover device 110, which creates a new employees table in the database 112.

In this particular example, the client device 108 then sends new rows of data to be appended to the employees table to the verifier device 104, which are illustrated below in Table 4:

TABLE 4

Rows to append to Employees table

| Weekly Pay | Yearly Bonus |
|---|---|
| 3000 | 100000 |
| 4500 | 30000 |

The verifier device 104 accepts this data and updates the commitment to each column. In this example, the new commitments are:

$$C_{Pay}^{new} = C_{Pay}^{old} \oplus 3000 \cdot G_4 \oplus 4500 \cdot G_5$$

$$C_{Bonus}^{new} = C_{Bonus}^{old} \oplus 100000 \cdot G_4 \oplus 30000 \cdot G_5$$

The verifier device 104 then sends the new rows to the prover device 110, which appends them to the employees table in the database 112.

The client device 108 in this example then sends the following SQL query toward the database 112, which is received by the verifier device 104, in order to determine the total compensation: SELECT Pay*52+Bonus FROM Employees. The verifier device 104 routes the query to the prover device 110, which executes the query via the query execution engine 310 by taking the pay column, multiplying it by 52, and adding the bonus column to generate a query result, which is sent back to the verifier device 104, and is reflected in the below Table 5:

TABLE 5

| Employees table along with total compensation | | |
|---|---|---|
| Weekly Pay | Yearly Bonus | result |
| 4000 | 50000 | 258000 |
| 7500 | 0 | 390000 |
| 5000 | 400000 | 660000 |
| 1500 | 0 | 78000 |
| 3000 | 100000 | 256000 |
| 4500 | 30000 | 264000 |

Because this query is relatively simple, the prover device 110 in this particular example does not need to send any additional proof to the verifier device 104, and the verifier device 104 receives only the result column of Table 5 from the prover device 110. To verify the query result (i.e., the result column of Table 5), the verifier device 104 mirrors the prover device 110 computation by taking the pay commitment, multiplying it by 52, and adding the bonus commitment, which is exactly the commitment to what the result should be, which is:

$$C_{result}^{correct} = 52 \cdot C_{Pay} \oplus C_{Bonus}$$

The verifier device 104 then computes the commitment to the query result sent from the prover device 110. If the prover device 110 sent the correct result, this should be:

$$C_{result}^{sent} = 258000 \cdot G_0 \oplus 390000 \cdot G_1 \oplus 660000 \cdot G_2 \oplus 78000 \cdot G_3 \oplus 256000 \cdot G_4 \oplus 264000 \cdot G_5$$

However, if the prover device 110 sent the wrong result, this computation will yield another value. Then, the verifier device 104 checks to see if $$C_{result}^{correct} = C_{r|esult}^{sent}$$

and, if so, the verifier device 104 sends the query result to the client device 108 along with a flag that confirms that the query result is correct. If the two values are not equal, then the verifier device 104 sends a failure message to the client device 108 indicating that there was an error, for example.

While the examples described above relate to proving SQL operations, this technology can be applied to any type of database query. For example, MongoDB, provided by MongoDB Inc. of New York City, NY, is one example of a NoSQL query execution engine that is built on a key-value store. A key-value lookup can be treated as a filter on the key. As a result, a key-value lookup could be proven as will now be described in the below example. MongoDB also supports filtering based on conditions, which could also be proven as in the example described below. These two operations cover most common MongoDB queries, although other operations associated with other queries and other types of query execution engines can be proven using the technology described and illustrated in detail herein.

Referring again to the example query, and specifically the SELECT*FROM transactions WHERE amount >10000 filter operation excerpt of the example query, the below Table 6 shows the transactions table (i.e., Table 1 above) along with the evaluate of the predicate amount >10000, where a 0 indicates a false value and a 1 indicates a true value:

TABLE 6

| Transactions Table with Predicate | | | |
|---|---|---|---|
| wallet | amount | type | predicate |
| 84448c61caf24b0a9f30bb1c27635aaa | 123 | 0 | 0 |
| 81aca786d50c4cc59b919ae9662802a8 | 10000 | 1 | 0 |
| 599ffee9812c4d00aff6be58d4192f11 | 203 | 1 | 0 |
| 81aca786d50c4cc59b919ae9662802a8 | 40020 | 1 | 1 |
| 84448c61caf24b0a9f30bb1c27635aaa | 20000 | 1 | 1 |
| 599ffee9812c4d00aff6be58d4192f11 | 4233 | 0 | 0 |

Proving a filter node associated with this excerpt of the example query can be broken down into two components: (1) proving the evaluation of the predicate and (2) proving the filtered result. In this case, the predicate can be proven using a range proof, for example, although other expressions can be proven using other techniques in other examples. The below Table 7 shows the correct, filtered result:

TABLE 7

| Filtered result with index | | | |
|---|---|---|---|
| wallet | amount | type | index |
| 81aca786d50c4cc59b919ae9662802a8 | 40020 | 1 | 3 |
| 84448c61caf24b0a9f30bb1c27635aaa | 20000 | 1 | 4 |

In one example, the above result can be proven correct by multiplying the predicate column by each of the other three columns. The result of this computation is Table 8 shown below with the rows that should be removed converted to zeros:

TABLE 8

| Transactions Table multiplied by Predicate | | | |
|---|---|---|---|
| wallet | amount | type | predicate |
| 0 | 0 | 0 | 0 |
| 0 | 0 | 0 | 0 |
| 0 | 0 | 0 | 0 |
| 81aca786d50c4cc59b919ae9662802a8 | 40020 | 1 | 1 |
| 84448c61caf24b0a9f30bb1c27635aaa | 20000 | 1 | 1 |
| 0 | 0 | 0 | 0 |

The commitments to the columns of Table 8 depend entirely on the data of the result of the filter. If the filter was the final result of the entire query, it would be sufficient for the prover device 110 to send to the verifier device 104 the filter result along with the index of each row in the original table (i.e., Table 1), which would allow the verifier device 104 to reconstruct the commitment and check it against the product that was proven.

As described and illustrated by way of the examples herein, this technology more effectively and efficiency facilitates verification of query results generated from untrusted databases, including untrusted decentralized databases. This technology leverages commitments, GPUs, and/or query plans (e.g., a DAG generated by a SQL query execution engine) to improve database scalability and verify the accuracy of query results. The commitments are updatable and the query results are verified by an intermediary device or service, for example, without requiring access by that device or service to the data hosted by the database.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A non-transitory computer readable medium having stored thereon instructions comprising executable code that, when executed by one or more processors, causes the one or more processors to:

receive a query associated with at least a portion of a database;

execute the query against obtained data to generate a query result, wherein the obtained data comprises at least part of the at least a portion of the database;

generate a proof, wherein the query, the query result, and the proof are associated with a commitment, the commitment comprises a value generated from other data previously ingested into the at least a portion of the database, and the commitment value is stored external to the database; and provide the proof and the query result in response to the query, wherein the commitment value enables verification of the query result against the proof.

2. The non-transitory computer readable medium of claim 1, wherein the query is received from a verifier configured to verify the query result against the proof using the commitment value.

3. The non-transitory computer readable medium of claim 1, wherein the proof comprises the query result.

4. The non-transitory computer readable medium of claim 1, wherein the query is received from a verifier, a client, an intermediary, or a gateway.

5. The non-transitory computer readable medium of claim 4, wherein the proof and the query result are returned to the verifier, client, intermediary, or gateway from which the query is received and the database is a blockchain database.

6. A system, comprising one or more verifiers, gateways, intermediaries, or clients comprising memory comprising instructions stored thereon and one or more processors coupled to the memory and configured to execute the instructions to:

execute a query against obtained data to generate a result, wherein the query is associated with a portion of a database and the obtained data comprises at least another portion of the portion of the database;

generate a proof associated with a commitment, wherein the commitment comprises a value generated from other data previously ingested into the portion of the database and the commitment value is stored external to the database; and provide the proof and the result in response to the query, wherein the commitment value enables verification of the result against the proof.

7. The system of claim 6, wherein the query is received from a verifier configured to verify the result against the proof using the commitment value.

8. The system of claim 6, wherein the proof comprises the result.

9. The system of claim 6, wherein the query is received from one of the one or more verifiers, gateways, intermediaries, or clients.

10. The system of claim 9, wherein the proof and the result are provided to the one of the one or more verifiers, gateways, intermediaries, or clients from which the query is received.

11. The system of claim 6, wherein the system is external to a blockchain network hosting the database which comprises a blockchain database.

12. A method, comprising:

executing a query against obtained data to generate a query result, wherein the query is associated with at least a portion of a database and the obtained data comprises at least part of the at least a portion of the database;

generating a proof, wherein the query, the query result, and the proof are associated with a commitment to the at least a portion of the database, the commitment comprises a value generated from other data previously ingested into the at least a portion of the database, and the commitment value is stored external to the database; and providing the proof and the query result in response to the query, wherein the commitment value enables verification of the query result against the proof.

13. The non-transitory computer readable medium of claim 1, wherein the commitment value is updatable and generated based on a commitment scheme.

14. The method of claim 13, wherein the method is implemented by one or more provers that are external to a blockchain network hosting the database.

15. The method of claim 13, wherein the method is implemented by one or more provers of a query verification apparatus that comprises nodes of a blockchain network hosting the database.

16. The method of claim 15, wherein the commitment value is updatable and generated based on a commitment scheme.

17. The method of claim 12, wherein the query is received from a verifier configured to verify the query against the proof using the commitment value.

18. The method of claim 12, wherein the proof comprises the query result.

19. The method of claim 12, further comprising receiving the query from a verifier, a client, an intermediary, or a gateway and providing the proof and the query result to the verifier, client, intermediary, or gateway from which the query is received.

20. The system of claim 6, wherein the commitment value is updatable and generated based on a commitment scheme.

* * * * *